United States Patent [19]

Schabert et al.

[11] Patent Number: 4,951,974
[45] Date of Patent: Aug. 28, 1990

[54] REMOTE-CONTROLLABLE SCREW CONNECTION

[75] Inventors: Hans-Peter Schabert, Erlangen; Erwin Laurer, Moehrendorf; Erich Strickroth, Buckenhof, all of Fed. Rep. of Germany

[73] Assignees: Siemens Aktiengesellschaft, Munich; Deutsche Gesellschaft für Wiederaufarbeitung von Kernbrennstoffen mbH, Hanover, both of Fed. Rep. of Germany

[21] Appl. No.: 369,629

[22] Filed: Jun. 21, 1989

[30] Foreign Application Priority Data

Jun. 27, 1988 [DE] Fed. Rep. of Germany ....... 3821641

[51] Int. Cl.$^5$ .................... F16L 19/03; F16B 43/00
[52] U.S. Cl. ................................ 285/39; 285/363; 285/902; 285/328; 411/533
[58] Field of Search ............... 285/405, 902, 24, 27, 285/39, 328, 363, 405; 411/533

[56] References Cited

U.S. PATENT DOCUMENTS

| | | | |
|---|---|---|---|
| 1,233,168 | 7/1917 | Berry | 285/405 X |
| 3,188,116 | 6/1965 | Christensen | 285/363 X |
| 4,268,070 | 5/1981 | Adams | 285/363 X |
| 4,438,956 | 3/1984 | Jones et al. | 285/363 X |
| 4,671,324 | 6/1987 | Neill | 285/27 X |

FOREIGN PATENT DOCUMENTS

| | | |
|---|---|---|
| 0208969 | 1/1987 | European Pat. Off. . |
| 1252483 | 4/1968 | Fed. Rep. of Germany . |
| 3223427 | 12/1983 | Fed. Rep. of Germany . |

Primary Examiner—Dave W. Arola
Assistant Examiner—Arlen L. Olsen
Attorney, Agent, or Firm—Herbert L. Lerner; Laurence A. Greenburg

[57] ABSTRACT

A remote-controllable screw connection includes a nut, a first flange relatively closer to and a second flange relatively further away from the nut. At least one screw bolt connects the flanges to the nut. A sheath surrounds the screw bolt between the nut and the first flange. The sheath is non-rotatably but axially displaceably connected to the screw bolt.

15 Claims, 1 Drawing Sheet

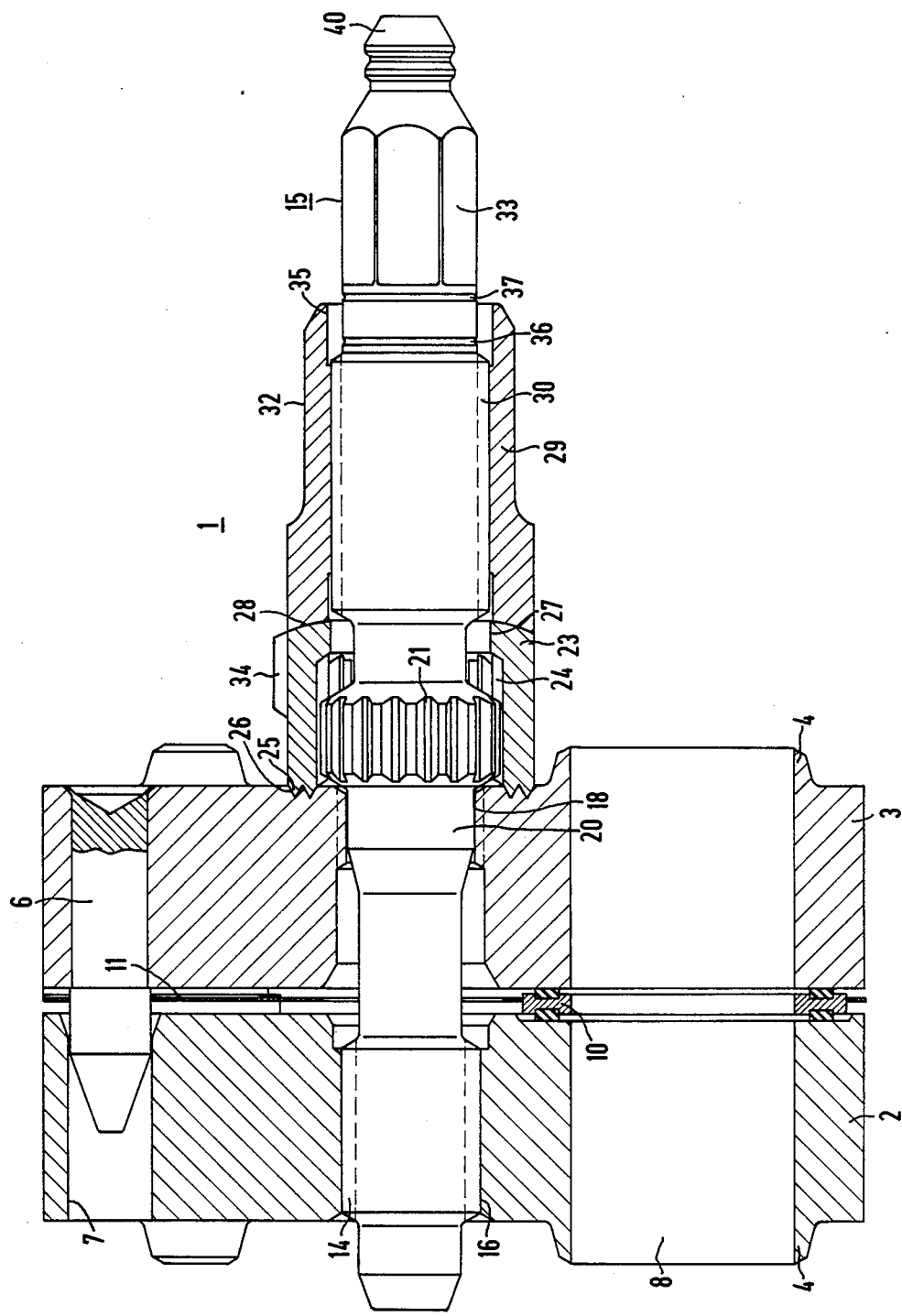

REMOTE-CONTROLLABLE SCREW CONNECTION

BACKGROUND OF THE INVENTION

1. Field of the Invention

The invention relates to a remote-controllable screw connection including two flanges being interconnected by means of at least one screw bolt having a nut, and a ring surrounding the screw bolt and being disposed between the nut and the flange oriented toward it.

2. Description of the Prior Art

Such rings in particular perform the task of preventing damage from scoring of the materials during rotation of the nut relative to the loose flange, which occurs due to of the high local pressure exerted on it. In the pipe connections known from Published European Application No. 0 208 969, two rings that surround the screw bolt and execute a lateral sliding surfaces. A loose flange mounted in a fixed flange is covered and retained with the lateral motion.

In another pipe connection according to German Patent DE-PS No. 1 252 483, the ring is provided with a spherical surface oriented toward the nut, in order to make it possible to adjust the nut on the flange.

However, the known rings are not always adequate for preventing damage under extreme conditions such as a high load, a corrosive atmosphere, long periods out of service, and above all if the effectiveness of a lubricant has been destroyed. The very greatly increased friction in such a case prevents the attainment of the clamping force for fastening the flange connection which is required, for instance, for securely sealing a pipe connection when the clamping element is clamped or re-clamped, even if high torque is used. It is particularly important to preclude damage at the loose flange if the loose flange is welded into a pipeline and can only be replaced with difficulty.

SUMMARY OF THE INVENTION

It is accordingly an object of the invention to provide a remote-controllable screw connection, which overcomes the hereinafore-mentioned disadvantages of the heretofore-known devices of this general type in a reliable manner.

With the foregoing and other objects in view there is provided, in accordance with the invention, a remote-controllable screw connection, comprising a nut, a first flange relatively closer to and a second flange relatively further away from the nut, at least one screw bolt connecting the flanges to the nut, and a sheath surrounding the screw bolt between the nut and the first flange, the sheath being non-rotatably but axially displaceably connected to the screw bolt.

The advantage attained through the use of the sheath is that during the tightening operation performed to clamp the pipe connection, the nut only rotates with respect to the stationary screw but not with respect to the flange. Frictional forces acting upon the flange are therefore eliminated. At the same time, scoring at that location is precluded. The tightening force for the screw connection is made uniform The sheath only transmits a purely longitudinal force, of 160 kN, for instance, upon the flange if a torque of 1500 Nm is brought to bear for tightening the nut, as a differential torque between the nut and the screw. A further advantage of the rotationally fixed sheath is that the torque introduced into the nut is fed back completely and directly through the screw, when the clamping element including the nut and the screw has two flat edges that can be rotated counter to one another with a differential mechanical screwdriver or wrench. A screwdriver or wrench can be supported on both, without some of the torque having to be transferred through the pair of flanges.

In accordance with another feature of the invention, there is provided an externally splined profile interconnecting the screw bolt and the sheath.

In accordance with a further feature of the invention, the externally splined profile has increased play, as compared with standardized dimensions, such as those of DIN 5480, in particular in the radial direction. The increase in play may, for instance, amount to 0.5 mm.

In accordance with an added feature of the invention, the sheath and the nut have mutually cooperating spherical surfaces.

In accordance with an additional feature of the invention, the nut has a thread, the externally splined profile has a given outside diameter, and the sheath has an inner shoulder facing toward the nut, the inner shoulder having an inside diameter being larger than the thread of the nut but smaller than the given outside diameter of the externally splined profile.

In accordance with yet another feature of the invention, the nut has a thread, and the screw bolt has a flat edge at the end of the thread of the nut for engagement by a tool.

In accordance with yet a further feature of the invention, the sheath has an outer surface with a flat edge or teeth for engagement by a tool.

In accordance with yet an added feature of the invention, the sheath has an end facing toward the first flange with circular V-grooves formed therein.

In accordance with yet an additional feature of the invention, the first flange has pre-formed V-grooves therein cooperating with the V-grooves formed in the sheath.

With this structure, the self-locking action of the screw bolt, screwed into the fixed flange, can be increased as desired. A smooth-running coarse thread can thus be used at this point, which is not very vulnerable to corrosion, and even without lubricant has virtually no tendency toward seizing or encrustation.

In accordance with again another feature of the invention, the nut has an end facing toward and an end facing away from the sheath, and the screw bolt has markings disposed thereon at the end of the nut facing away from the sheath.

The markings provide visible marks with which a check can be made, after the clamping of the screw connection, as to whether or not the axial force of the nut does in fact extend through the flange connection and any seal possibly located between flanges.

In accordance with again a further feature of the invention, the screw bolt has an end facing away from the sheath, and a rotationally symmetrical ridged knob disposed on the end of the screw bolt.

The screw unit (the screw, sheath and nut) can be firmly held at this knob with a gripper installed in a screwdriver or wrench, while the coarse thread of the screw bolt is unscrewed from the fixed flange and optionally from the loose flange as well. In this way, tight screws that are hard to unscrew can be easily removed and replaced with a new screw unit by remote control.

In accordance with again an added feature of the invention, the screw bolt is manufactured from heat-treated or tempered steel and has a rolled thread.

In accordance with a concomitant feature of the invention, the flanges are part of a remote-controllable pipe connection having a seal encompassing the screw bolt.

Other features which are considered as characteristic for the invention are set forth in the appended claims.

Although the invention is illustrated and described herein as embodied in a remote-controllable screw connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the drawing.

BRIEF DESCRIPTION OF THE DRAWING

The drawing is a diagrammatic, partly broken-away sectional view showing a screw connection according to the invention, in the form of a pipe connection.

DESCRIPTION OF THE PREFERRED EMBODIMENT

Referring now to the single figure of the drawing in detail, there is seen a pipe connection 1 intended for systems which are not accessible to humans, such as can be found, for instance, in nuclear facilities and in particular in a reprocessing system. In the pipe connection 1, two flanges 2 and 3 must be tightly connected to one another by remote control. Non-illustrated pipelines are welded to pipe stubs 4 of the flanges. The flange 2 is the so-called fixed flange, because it is fixedly mounted in the system. The flange 3 is the so-called loose flange, because detachable connecting lines are attached thereto.

The flange 3 has a centering bolt 6 which engages the inside of a centering bore 7 formed in the fixed flange 2. The correct relative position of the flanges 2 and 3 is thus also assured in the vicinity of a through bore 8, which is to be sealed off with a seal 10. The seal 10 is also suspended from the centering pin 6 with a retention strip 11.

In order to close the pipe connection 1, a thread 14 of a screw bolt 15 is screwed into a threaded bore 16 of the fixed flange 2. The thread 14 and the threaded bore 16 have a coarse thread, M 36×8. In order to provide easier screw driving and for the sake of smooth running, the screw connection has a large play, namely 2 mm axially and diametrically. An identical coarse thread is also provided in a region 18 of the flange 3 remote from the flange 2, which prevents the loose flange 3 from falling away from the screw bolt 15.

The screw bolt 15 has a centering bulge or thickening 20 with which the screw bolt can engage the threaded region 18, and the screw bolt 15 is also provided with an externally splined profile 21 contiguous with the bulge or thickening 20, which is constructed in accordance with DIN 5480, but which has a play that is increased radially by 0.5 mm, namely having an outside diameter of 44 mm. The externally splined profile 21 of the screw bolt 15, which may be 20 mm long, for instance, engages a complementary splined profile region 24 of a sheath 23 that surrounds the screw bolt. However, the splined profile region 24 of the sheath 23 is markedly longer than the splined region 21 of the screw, for instance twice as long, so that a displacement motion of the sheath 23 in the axial direction is possible. Contrarily, in the circumferential direction, the screw bolt 15 and the sheath 23 are non-rotatably connected.

The end surface of the sheath 23 oriented toward the flange 3 has V-grooves 25 formed therein, which engage a portion of the flange 3 having correspondingly pre-formed V-grooves 26. An increase in friction is attained with these V-grooves, which increases the self-locking action of the screw 15 in the pipe connection 1. The other end of the sheath has an inner shoulder 27 with an inside diameter which is smaller than the outside diameter of the externally splined profile 21, in order to prevent slippage over the free end of the screw bolt 15.

The end of the sheath 23 remote from the flange 3 is provided with a spherically rounded surface 28. The surface 28 cooperates with a correspondingly rounded surface of a nut 29, which is seated on a thread 30 of the screw bolt 15. The thread 30 is a fine thread, M 39×4. The thread 30 serves to clamp the pipe connection 1 after the coarse thread 14, 16 has been closed, so that an abutment for the clamping force has been created.

In order to provide clamping, the nut 29 is rotated relative to the screw bolt 15 by using a differential mechanical screwdriver or wrench on a flat edge 32, in particular a hexagon, on the nut. The screw bolt 15 likewise has a flat edge, in the form of a hexagon 33. During this rotation of the nut 29, the connection with respect to the flange 3 is unstressed, because the sheath 23 is non-rotatably connected to the screw bolt 15. Alternatively, the screw bolt 15 could also be retained by the sheath 23, which would then be provided with teeth 34 or a flat edge.

The nut 29 is tightened until such time as a desired torque for the pre-stressing of the pipe connection 1 is attained The location of a rim 35 of the nut 29 relative to notches 36 and 37 on the screw bolt 15, shows that the clamping action is transmitted from the screw bolt 15 through the thread 16 to the flange 2 and from the flange 2 through the seal 10 to the flange 3, which in turn is supported through the sheath 23 against the nut 29. An incorrect positioning of the sheath 23, for instance in which the sheath was seated on the splines of the splined shaft 21, would produce a different position with respect to the markings 36, 37.

The drawing also shows that the screw bolt 15 has a rotationally symmetrical ridged knob 40 on the end thereof remote from the flanges 2, 3. The knob permits the screw screw bolt 15 is unscrewed from the coarse thread 16 of the fixed flange 2 and optionally from the loose flange 3.

The foregoing is a description corresponding in substance to German Application P No. 38 21 641.8, dated June 27, 1988, the International priority of which is being claimed for the instant application, and which is hereby made part of this application. Any material discrepancies between the foregoing specification and the aforementioned corresponding German application are to be resolved in favor of the latter.

We claim:

1. Remote-controllable screw connection, comprising a nut, a first flange relatively closer to and a second flange relatively further away from said nut, at least one screw bolt connecting said flanges to said nut, and a sheath surrounding said screw bolt between said nut and said first flange, said sheath having means for making said sheath non-rotatable and displaceable with respect to said screw bolt.

2. Screw connection according to claim 1, said means including an externally splined profile interconnecting said screw bolt and said sheath.

3. Screw connection according to claim 2, wherein said externally splined profile has increased play.

4. Screw connection according to claim 3, wherein said play is in radial direction.

5. Screw connection according to claim 2, wherein said nut has a thread, said externally splined profile has a given outside diameter, and said sheath has an inner shoulder facing toward said nut, said inner shoulder having an inside diameter being larger than said thread of said nut but smaller than said given outside diameter of said externally splined profile.

6. Screw connection according to claim 1, wherein said sheath and said nut have mutually cooperating spherical surfaces.

7. Screw connection according to claim 1, wherein said nut has a thread, and said screw bolt has a flat edge at the end of said thread of said nut for engagement by a tool.

8. Screw connection according to claim 1, wherein said sheath has an outer surface with a flat edge for engagement by a tool.

9. Screw connection according to claim 8, wherein said first flange has V-grooves formed therein cooperating with said V-grooves formed in said sheath.

10. Screw connection according to claim 1, wherein said sheath has an outer surface with teeth for engagement by a tool.

11. Screw connection according to claim 1, wherein said sheath has an end facing toward said first flange with circular V-grooves formed therein.

12. Screw connection according to claim 1, wherein said nut has an end facing toward and an end facing away from said sheath, and said screw bolt has markings disposed thereon at said end of said nut facing away from said sheath.

13. Screw connection according to claim 1, wherein said screw bolt has an end facing away from said sheath, and a rotationally symmetrical ridged knob disposed on said end of the screw bolt.

14. Screw connection according to claim 1, wherein said screw bolt is manufactured from heat-treated steel and has a rolled thread.

15. Screw connection according to claim 1, wherein said flanges are part of a remote-controllable pipe connection having a seal encompassing said screw bolt.

* * * * *